Jan. 19, 1965     C. R. RUTTER     3,165,858
METHOD OF MAKING A FISHING LURE
Filed Jan. 24, 1963
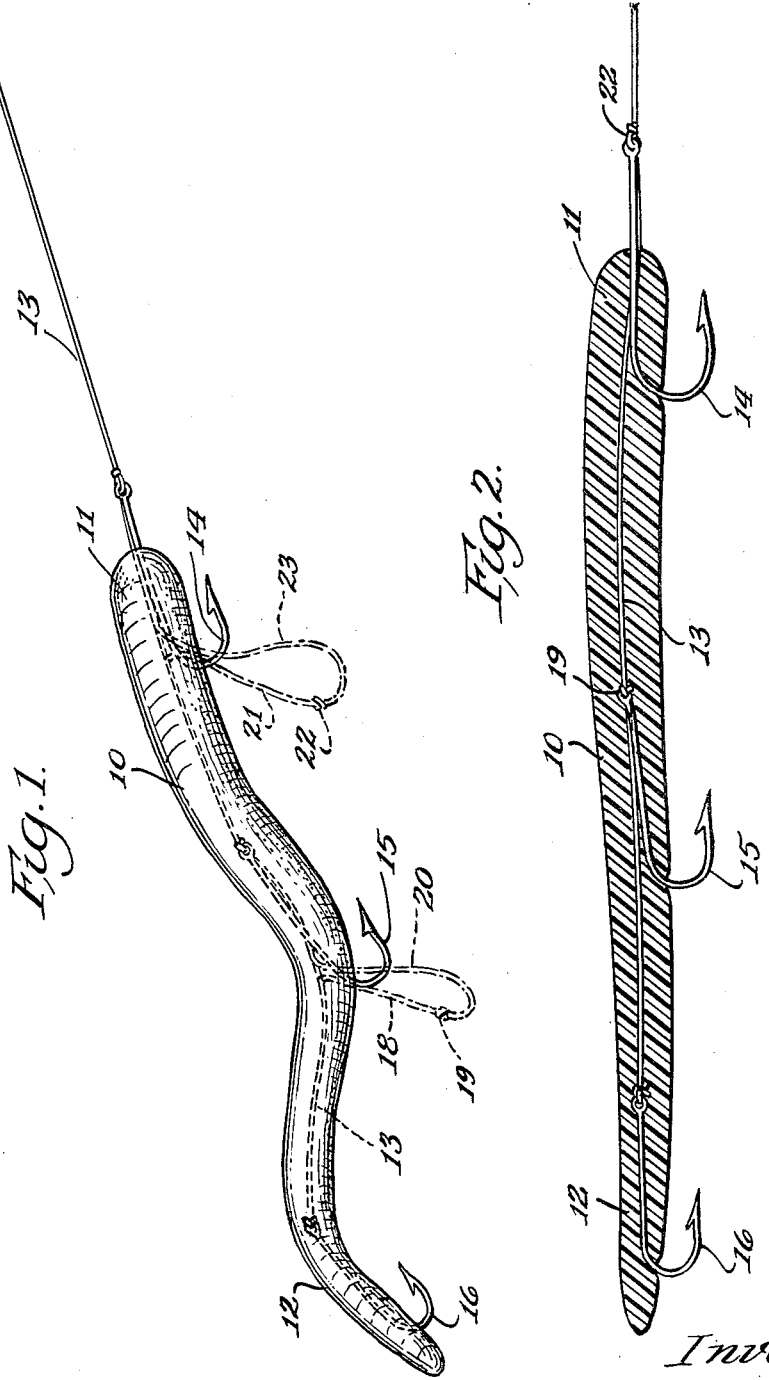
Inventor
Charles R Rutter
By
Attys.

United States Patent Office 3,165,858
Patented Jan. 19, 1965

3,165,858
METHOD OF MAKING A FISHING LURE
Charles R. Rutter, 1114 Walnut St., Mount Carmel, Ill.
Filed Jan. 24, 1963, Ser. No. 253,563
1 Claim. (Cl. 43—42.53)

The present invention relates to a method of making fishing lures, and more particularly to a lure or bait of an elongated worm form.

Fishing lures in the form of artificial worms made of a suitable plastic material are known, but such lures generally are provided only to be impaled on a fishhook in substitution for a real worm, or are formed with a weight or the like to have a particular motion in the water. In either case, the artificial worm employs only a single hook, so that a large proportion thereof is exposed to being bitten or torn away by a fish without the hook being swallowed. By the present invention, a lure is provided which employs a plurality of hooks with an artificial worm in such fashion as practically to assure hooking of a fish taking the bait. The possibility of a fish tearing away a portion of the worm body without touching a hook is practically eliminated, thus preventing the lure being rendered useless without first being effective. In addition, the lure of this invention may be used many times over, since even if the worm body is cut or torn into two or more parts, the parts are held in substantially contiguous relation and maintain the appearance of a single and continuous body. The hooks are arranged with the shanks, or at least major portions of the shanks, embedded or enclosed within the worm body, so that the likelihood of the bait becoming snagged or entangled in weeds is greatly reduced, as well as the possibility of a fish taking the lure and missing the hooks. Preferably the hooks are of decreasing size from the front end toward the rear of the lure. The bait has a very life-like motion in the water.

The invention contemplates a simple and effective method of forming the lure, by which the lure may be easily and quickly made, so that it is inexpensive to produce and use. By the method, the hooks are strung at intervals on a strong flexible line extending lengthwise through the artificial worm body and projecting from the front end thereof, and are disposed with their shanks enclosed in the body.

An object of the invention is the provision of a method of making the lure which is simple, easy, and rapid, so as to reduce the cost of the lure and thus promote its use.

Another object is the provision of a method of making the lure by securing a plurality of hooks to a strong, flexible line in spaced relation therealong and disposing the line and the shanks of the hooks in the lure body.

Other and further objects, advantages, and features of the invention will be apparent to those skilled in the art from the following description and the accompanying drawings, in which:

FIG. 1 is a side elevational view of the lure on a somewhat enlarged scale; and

FIG. 2 is a longitudinal sectional view of the lure.

Referring to the drawings, the lure is illustrated as comprising an elongated worm-like body 10, which may be formed of a synthetic plastic material to imitate a real worm in shape, color, size, markings, and the like, tapering from a head end 11 to a rear or tail end 12. Extending lengthwise through the body 10 is a strong but very flexible line 13 to which are attached at intervals a plurality of fishhooks, three hooks 14, 15 and 16 being shown in the present case. The line which may be a monofilament of any suitable synthetic plastic material or fiber, extends from adjacent the tail end 12 through the body and out through the head end 11 for securement to another line or the like. The hook 14 at the head end is the largest of the three hooks shown, the hook 15 adjacent the center of the lure is of intermediate size, and the hook 16 at the tail end is the smallest. In the embodiment of the invention illustrated, the hooks 15 and 16 have their shank portions completely enclosed or embedded in the body 10, while the hook 14 has the end of its shank projecting out of the head end 11, although the shank may be disposed like the others. The line 13, which is of very flexible material so as not to interfere with the motion of the flexible body 10, serves as the snell for all three hooks, as will be evident. The number of hooks provided may vary, so long as a plurality of hooks is used.

A fish attempting to swallow the lure is almost certain to be hooked by at least one of the hooks 14, 15, and 16, which of course is the purpose of the lure. The line 13 extending within the body 10 takes the strain involved in playing and landing the fish, and thus the body is not subjected to any substantial degree of tension so that it is not pulled apart. The use of a plurality of hooks spaced along a line instead of only a single hook on which the worm-like body is impaled assures that the body will not be bitten or torn in two by a fish taking the lure but missing the hook. Furthermore, even if the body in the course of repeated use becomes severed into two or more pieces, they will still remain strung on the line 13 and give the appearance of a single integral piece. The disposition of the hooks with the shank portions thereof largely if not completely enclosed in the body 10 with the hook portions projecting outwardly serves to conceal the hooks to a large extent, and to minimize the possibility of the lure becoming snagged, or caught in weeds or the like, without interfering with the hooking of fish. It will be apparent that the use of a single line for all the hooks, in addition to the advantages noted hereinabove, avoids the effects of having a plurality of hooks each on a separate snell to extend away from the body 10, so that a hook would not necessarily be swallowed with the body, and tending to catch on and become entangled with objects or growths in the water.

One method of making the lure is by attaching the hooks to the line 13 in the longitudinally spaced arrangement described, and molding the body about the line and the hook shanks, substantially in the position and arrangement shown in the drawings, particularly as viewed in FIG. 2.

Another method is to engage one end of the line 13 with a needle or similar implement, and draw it through the lure body 10 thereby. In practicing this method, the hook 16 is secured to the trailing end of the line, and its shank pulled into the body after the line. The needle is then employed to puncture the side of the body and together with the line is pulled outwardly of the body at the central portion thereof, as indicated at 18 in FIG. 1, to allow of the attachment thereto by a knot or hitch 19, or other suitable means, of the central hook 15. The needle together with the line, as indicated at 20, is drawn back inwardly into the body again substantially at its point of emergence, and the shank of the hook is pulled into the body therewith and thereby. The line 13 is passed forwardly and out of the body 10 near the head end 11 as indicated at 21, so that the forward hook 14 may be secured as by a knot 22 to the line, which then is drawn back into the body as at 23 and out through the head end, the end of the shank of this hook also being pulled out of the head end in this instance. It will be evident that if desired the hooks may be secured to the line in such manner as to remain substantially outside of the body until the line is drawn forwardly out of the head end, all then being pulled into position simultaneously.

It will be understood that the foregoing disclosure of the invention is exemplary, and that modifications and variations may be made without departing from the inventive concept.

I claim:

The method of making a lure which comprises the steps of providing an elongated worm-like body of soft flexible material, securing a plurality of fish hooks in longitudinally spaced relation to a length of a strong flexible line, embedding the line and at least a major portion of the shank of each hook in said body, the embedding of the line being accomplished by drawing thereof lengthwise through said body from adjacent one end to adjacent the other end, said drawing of the line including pulling to the outside of the body at least at one point along the length thereof a portion of the line and thereafter returning each said line portion to the inside of the body, and said embedding of the hook shank portions is accomplished by securing the shank portions to the line exteriorly of the body and drawing the shank portions into the body by said drawing of the line, said securing of the shank of a hook to each said line portion being accomplished while the line portion is outside the body.

References Cited in the file of this patent
UNITED STATES PATENTS

| | | |
|---|---|---|
| 2,102,739 | Peters | Dec. 21, 1937 |
| 2,149,054 | Jones | Feb. 28, 1939 |
| 2,690,026 | King | Sept. 28, 1954 |
| 2,722,766 | Accetta | Nov. 8, 1955 |
| 2,785,497 | Berry | Mar. 19, 1957 |
| 2,792,662 | Norton | May 21, 1957 |
| 3,017,716 | Hawks | Jan. 23, 1962 |
| 3,046,689 | Woodley | July 31, 1962 |